United States Patent Office
3,651,122
Patented Mar. 21, 1972

3,651,122
SULFAMYL BENZOIC ACID COMPOUNDS
Laszlo Beregi, Boulogne, Pierre Hugon, Rueil Malmaison, Jean-Claude Le Douarec, Suresnes, and Michel Laubie, Vaucresson, France, assignors to Science Union et Cie, Societe Francaise de Recherche Medicale, Suresnes, France
No Drawing. Filed June 12, 1968, Ser. No. 736,286
Claims priority, application Great Britain, June 12, 1967, 27,112/67
Int. Cl. C07c *143/52*
U.S. Cl. 260—470                 5 Claims

ABSTRACT OF THE DISCLOSURE $\beta$ - (3 - sulfamyl - 4 - chlorobenzoyloxy) ethylamine and $\beta$ - (3 - sulfamyl - 4,6 - dichlorobenzoyloxy) ethylamine substituted on the amine function by —Alk—Ar wherein —Alk is —$CH_2$— or

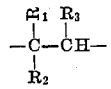

wherein $R_1$ and $R_2$ are hydrogen or methyl and $R_3$ is hydrogen or alkoxy of up to $C_4$ inclusive, and —Ar is phenyl, chlorophenyl, bromophenyl or trifluoromethyl phenyl.

These compounds possess anorexigenic and diuretic properties and antihypertensive and lipid metabolism regulating activities.

---

The present invention provides sulphamyl-benzoic acid compounds of the general formula

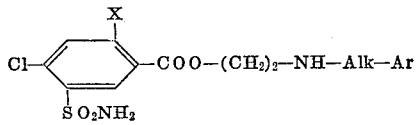

and physiologically tolerable acid addition salts thereof, wherein

X represents a hydrogen atom or a chlorine atom;

Alk represents a —$CH_2$— or 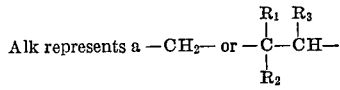

group in which $R_1$ and $R_2$ each represents a hydrogen atom or a methyl group, and $R_3$ represents a hydrogen atom or lower alkoxy radical containing up to 4 carbon atoms inclusive; and Ar represents a phenyl radical or phenyl substituted by one or more substituents selected from bromine, chlorine, and trifluoromethyl.

It will be observed that some of the compounds of the above general Formula I possess an asymmetrical carbon atom, so that these particular compounds will exist in the form of optical isomers which can be obtained by resolution from the corresponding racemic compounds or from starting products optically active. Such optical isomers are included within the scope of the present invention.

The compounds of the general Formula I are new and may be prepared by esterifying the hydrochloride of an amino alcohol of the Formula II Ar—Alk—NH—$(CH_2)_2$—OH, HCl      (II)

wherein Ar and Alk have the meanings given above, with a 3-sulphamyl-4-chloro benzoic acid chloride of the Formula III

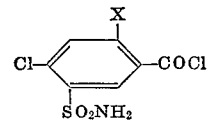               (III)

or with a 3-chloro-sulphonyl-4-chloro benzoic acid chloride of the Formula IV

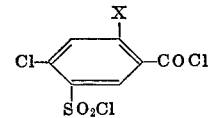               (IV)

wherein X has the meaning given above, in order to obtain the hydrochloride of the corresponding ester. Chlorides of sulphamyl or chlorosulphonyl benzoic acids of the general Formula III or IV can be reacted with numerous amino-alcohols of the general Formula II in the presence or absence of suitable inert organic solvents as, for example, benzene, xylene, chloroform.

The ester salts so obtained may be reacted with ammonium hydroxide to obtain the sulfamyl ester bases of the Formula I.

The esters of the general Formula I when treated with inorganic and organic acids form the corresponding addition salts.

As acids suitable for the formation of acid addition salts, there may be mentioned mineral acids such, for example, as hydrochloric, hydrobromic, sulphuric, phosphoric and sulphamic acid; suitable organic acids are, for example, acetic, propionic, maleic, fumaric, tartaric, citric, oxalic, methanesulphonic and benzoic acid.

The new compounds and physiologically tolerable salts thereof possess valuable pharmacological and therapeutic properties, and find application more specifically as anorexigenic and diuretic agents.

The invention also provides pharmaceutical preparations for oral, rectal or parenteral administration in the treatment of obesity/water-retention. These compositions comprise a compound of the general Formula I or a physiologically tolerable salt thereof in admixture or conjunction with a pharmaceutically suitable solid or liquid carrier.

The following examples illustrate the invention, the parts being by weight unless otherwise stated and melting points being determined by the Kofler method.

EXAMPLE 1

1-phenyl-2-[$\beta$-(3'-sulphamyl-4'-chlorobenzoyloxy) ethylamino] propane hydrochloride To 8.6 parts of 1-phenyl-2-[($\beta$-hydroxy-ethyl)]amino propane hydrochloride there are added 10.2 parts of 3-sulphamyl-4-chlorobenzoic acid chloride and the reaction mixture is stirred for 30 minutes at 90–100° C. The hydrochloric acid formed during the reaction is continuously titrated by a solution of 1 N-NaOH. At the end of the reaction, a current of nitrogen is passed into the reaction mixture and the temperature held for an additional 15 minutes at 100° C. The amount of hydrochloric acid corresponds to 90% of the theoretical yield. The solid product thus obtained was brought to a boil with 64 parts of anhydrous methanol. On cooling the product crystallizes; there were obtained 12 parts, melting at 198–200° C.

By the same method as in Example 1, the following compounds were prepared:

EXAMPLE 2

1 - (3″,4″ - dichlorophenyl) - 2 - [β - (3′ - sulphamyl-4′ - chlorobenzoyloxy) ethylamino] propane hydrochloride, melting point 228–230° C., starting from 1-(3′,4′-dichlorophenyl) - 2 - [(β - hydroxyethyl) - amino] propane hydrochloride and 3-sulphamyl-4-chlorobenzoyl chloride.

EXAMPLE 3

1 - phenyl - 2 - [β - (3′ - sulphamyl - 4′ - chlorobenzoyloxy) ethylamino] ethanehydrochloride, melting point 208–209° C. (acetic acid), starting from 1-phenyl-2-[(β-hydroxyethyl)-amino] ethane hydrochloride and 3- sulphamyl-4-chlorobenzoyl chloride.

EXAMPLE 4

1 - phenyl - 1 - methoxy - 2 - [β - (3′ - sulphamyl - 4′-chlorobenzoyloxy) ethylamino] ethane hydrochloride, melting point 237–239° C. (acetic acid), starting from 1 - phenyl - 1 - methoxy - 2 - [(β - hydroxyethyl) - amino] ethane hydrochloride and 3-sulphamyl-4-chlorobenzoyl chloride. The 1-methoxy group in the product can be replaced by ethoxy, propoxy, isopropoxy or various butoxy radicals by proper selection of the corresponding starting material.

EXAMPLE 5

1 - (m - trifluoromethylphenyl) - 2 - methyl - 2 - [β-(3′ - sulphamyl - 4′ - chlorobenzoyloxy) ethylamino] propane hydrochloride, melting point 209° C. (ethanol), starting from 1 - (m - trifluoromethylphenyl) - 2 - methyl-2 - [(β - hydroxyethyl) - amino] propane hydrochloride and 3-sulphamyl-4-chlorobenzoyl chloride.

EXAMPLE 6

1 - (p - chlorophenyl) - 2 - methyl - 2 - [β - (3′-sulphamyl - 4′ - chlorobenzoyloxy) ethylamino] propane hydrochloride, melting point 240–242° C. (acetic acid), starting from 1 - (p - chlorophenyl) - 2 - methyl - 2-[(β - hydroxyethyl) - amino] propane hydrochloride and 3-sulphamyl-4-chlorobenzoyl chloride.

EXAMPLE 7

N - (o - bromobenzyl) - [β - (3′ - sulphamyl-4′-chlorobenzoyloxy)] ethylamine hydrochloride, melting point 238–240° C. (water), starting from N-(o-bromobenzyl)-β-hydroxyethyl amine hydrochloride and 3-sulphamyl-4-chlorobenzoyl chloride.

EXAMPLE 8

N-benzyl-[β(3′ - sulphamyl - 4′ - chlorobenzoyloxy)] ethylamine hydrochloride, melting point 214–216° C. (acetic acid), starting from N-benzyl - β - hydroxyethylamine hydrochloride and 3-sulphamyl-4-chlorobenzoyl chloride.

EXAMPLE 9 l - 1 - (m - trifluoromethylphenyl) - 2 - [β-(3′ - sulphamyl - 4′ - chlorobenzoyloxy) ethylamino] propane, base melting at 138–139° C. (benzene), [α]$_D^{27}$=−9.2° (C.16/dimethylformamide), starting from l-1-(m-trifluoromethylphenyl - 2 - [(β - hydroxyethyl) - amino] propane hydrochloride and 3-sulphamyl-4-chlorobenzoyl chloride.

EXAMPLE 10 d-1-(m-trifluoromethylphenyl) - 2 - [β-(3′-sulphamyl-4′-chlorobenzoyloxy) ethylamino] propane, base melting at 136° C. (benzene), [α]$_D^{27}$=+8.2° (C.16/dimethylformamide) starting from d - 1 - (m - trifluoromethylphenyl) - 2 - [(β - hydroxyethyl)-amino] propane hydrochloride and 3-sulphamyl-4-chlorobenzoyl chloride.

EXAMPLE 11 d-1-phenyl - 2 - [β-(3′-sulphamyl - 4′ - chlorobenzoyloxy) ethylamino] propane hydrochloride melting point 202° C., melting point (micro Kofler) 186–190° C. (ethanol), [α]$_D^{27}$=+13°±1 (C.4/dimethylformamide), M.P. of the base: 139° C., melting point (micro Kofler) of the base: 132–135° C. (isopropanol), [α]$_D^{27}$ of the base=+13.7°±0.5 (C.16/dimethylformamide), starting from d-1-phenyl - 2 - [(β-hydroxyethyl)-amino] propane hydrochloride and 3-sulphamyl-4-chlorobenzoyl chloride.

EXAMPLE 12 l-(m-trifluoromethylphenyl)-2-[β-(3′-sulphamyl-4′-chlorobenzoyloxy) ethylamino] propane To a solution of 7.4 parts of l-(m - trifluoromethylphenyl) - 2 - [(β-hydroxyethyl) amino] propane in 180 parts of anhydrous benzene, there were added successively 5.4 parts of 3.9 N hydrochloric ether and 7.6 parts of 3-sulphamyl - 4 - chlorobenzoic acid chloride. The reaction mixture was then refluxed for 5 hours.

The solid product was collected by filtration; there were obtained 11.5 parts of 1-(m-trifluoromethylphenyl-2 - [β - (3′ - sulphamyl - 4′ - chlorobenzoyloxy) ethylamino] propane hydrochloride, melting point 160–165° C. 24.7 parts of this hydrochloride are dissolved in 220 parts of acetone; 50 parts of a concentrated solution of ammonium hydroxide are added while maintaining the temperature at 10–15° C. After addition of 500 parts of water, the mixture is stirred for 1 hour.

Twenty nine parts of the base crystallizes out melting at 140–142° C. After recrystallization from 250 parts of isopropanol, there were obtained 23 parts of 1-(m-trifluoromethylphenyl) - 2 - [β-(3′-sulphamyl - 4′ - chlorobenzoyloxy) ethylamino] propane, base. Melting point 142–143° C.

The compounds of the following examples have been prepared according to the process described in Example 12:

EXAMPLE 13

1-(m-trifluoromethylphenyl) - 2 - [β-(3′ - sulphamyl-4′,6′ - dichloro benzoyloxy) ethylamino] propane base, melting point 131–132° C. (isopropanol), starting from 1 - (m - trifluoromethylphenyl) - 2 - [(β-hydroxyethyl) amino] propane and 3-sulphamyl-4,6-dichloro benzoic acid chloride.

EXAMPLE 14

1-(3″,4″ - dichlorophenyl) - 2 - [β-(3′ - sulphamyl-4′-chlorobenzoyloxy) ethylamino] propane base, melting point 180–181° C. (dimethylformamide/water), starting from 1-(3′,4′ - dichlorophenyl) - 2 - [(β-hydroxyethyl) amino] propane and 3-sulphamyl-4-chlorobenzoyl chloride.

EXAMPLE 15

1-phenyl - 1 - methoxy - 2 - [β-(3′ - sulphamyl - 4′-chlorobenzoyloxy) ethylamino] ethane base, starting from 1 - phenyl - 2 - [(β-hydroxyethyl) amino] ethane and 3-sulphamyl - 4 - chlorobenzoyl chloride. The 1-methoxy group in the product can be replaced by ethoxy, propoxy, isopropoxy, or various butoxy radicals by proper selection of the starting material.

EXAMPLE 16

1-(m-trifluoromethylphenyl) - 2 - [β-(3′ - sulphamyl-4′-chlorobenzoyloxy) ethylamino] propane, methane sulphonate.

7.9 parts of the base obtained in Example 12 are dissolved in 110 parts of anhydrous isopropanol at a temperature of 60° C. and a solution of 1.8 parts of methane sulphonic acid in 10 parts of isopropanol is added. The salt separates in a well-crystallized form which, after recrystallization from 340 parts of isopropanol, melts at 171–172° C.

EXAMPLE 17

1-(m-trifluoromethylphenyl) - 2 - [β-(3′ - sulphamyl-4′-chlorobenzoyloxy) ethylamino] propane base.

A mixture of 13.5 parts of 1 - (m - trifluoromethylphenyl) - 2 - [(β-hydroxyethyl) amino] propane hydrochloride and 13 parts of 3-chlorosulphonyl - 4 - chloro benzoic acid chloride was maintained at 95–100° C. for 1 hour with a slight current of nitrogen. The viscous liquid thus obtained was dissolved in 80 parts of anhydrous xylene at 100° C. On cooling, 16 parts of 1-(m-trifluoromethylphenyl) - 2 - [β-(3' - chlorosulphonyl-4'-chlorobenzoyloxy) ethylamino propane hydrochloride crystallizes out, melting at 188–190° C.

Five parts of this hydrochloride are suspended in 50 parts of acetone; 7.5 parts of a concentrated solution of ammonium hydroxide are added, while maintaining the temperature at 10–15° C. After addition of 50 parts of water, the mixture is stirred for 1 hour. 3.5 parts of 1-(m-trifluoromethylphenyl) - 2 - [β-(3' - sulphamyl - 4'-chloro benzoyloxy) ethylamino] propane base crystallizes out, melting point 140–141° C.; recrystallized from 200 parts of isopropanol, this base melts at 142–143° C.

The pharmacological tests made with the new compounds of the invention have shown the following properties:

Their toxicity is very low and the $LD_{50}$ studied in mice according to the method of J. T. Litchfield and F. Wilcoxon (J. Pharm. Exp. Therap. 97 99–113 (1949)), varies between 500 and >2000 mg./kg.

The anorexigenic activity was studied according to the J. C. LeDouarec's method (Thesis, University of Paris, Serial U No. 382 (1963)). It was found that the dose suppressing entirely the food intake for two hours varies from 2.5 to 20 mg./kg. p.o. in the dog, and from 7.5 to 40 mg./kg. in the rat.

The administration of the new compounds provokes an important increase of diuresis. It was noted that doses of 1 to 30 mg./kg. administered per os in the rat increase the urinary volume from 30 to 120% with a corresponding increase of the elimination of the electrolytes.

In using the new compounds for 5 to 10 days at a dose of 2 to 5 mg./kg. in the rat p.o., a decrease in blood pressure of 20 to 40 mm. Hg is observed.

An interesting activity of the new compounds on the lipid metabolism was also observed. An average dose of 5 to 10 mg./kg. p.o. provokes in the rat an increase of the plasma free fatty acids, according to the method of Dole V.P. published in J. Clin. Invest. 35, 150 (1956), and the daily administration of 2 to 10 mg./kg. p.o. for 5 to 10 days results in a decrease in the weight of the epididymal fat proportional to the dose up to 30% in comparison with the untreated animals. A decrease of the weight intake of the animals is also observed.

The new compounds are useful and may be administered in animal or human therapy, more especially in the treatment of obesity, water retention of renal or cardiac origin, and hypertension. They may be associated with the usual pharmaceutical vehicles such as distilled water, talc, starch, magnesium stearate, ethyl cellulose, etc., according to the selected pharmaceutical form and administration route.

The doses of the active principle may vary from 20 to 200 mg., 3 or 4 times per day.

It is to be understood that the invention is not to be limited to the exact details of operation or exact compounds, compositions, or procedures shown and described, as obvious modifications and equivalents will be apparent to one skilled in the art, and the invention is therefore to be limited only by the scope of the appended claims.

What we claim is:

1. A compound selected from the group consisting of (A) sulfamyl benzoic acid compounds of Formula I:

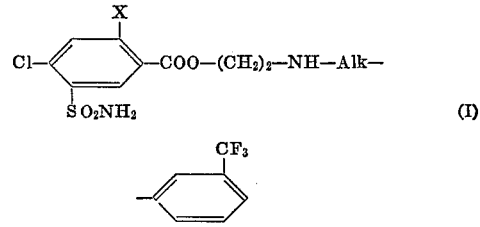

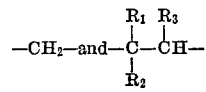

wherein

X is selected from the group consisting of hydrogen and chlorine,

Alk is selected from the group consisting of $$-CH_2-\text{and}-\underset{R_2}{\overset{R_1}{C}}-\overset{R_3}{\underset{}{C}H}-$$

wherein $R_1$ and $R_2$ are independently selected from the group consisting of hydrogen and methyl, and $R_3$ is selected from the group consisting of hydrogen and lower-alkoxy of 1 to 4 carbon atoms inclusive, and (B) their optical isomers, and (C) physiologically acceptable acid addition salts thereof with organic and mineral acids.

2. A compound of claim 1 which is 1-(m-trifluoromethylphenyl) - 2 - [β-(3' - sulfamyl - 4' - chlorobenzoyloxy) ethylamino] propane.

3. A compound of claim 1 which is d - 1 - (m - trifluoromethylphenyl) - 2 - [β-(3' - sulfamyl - 4' - chlorobenzoyloxy) ethylamino] propane.

4. A compound of claim 1 which is 1 - (m-trifluoromethylphenyl) - 2 - [β-(3' - sulfamyl - 4' - chlorobenzoyloxy) ethylamino] propane hydrochloride.

5. A compound of claim 1 which is 1 - (m-trifluoromethylphenyl) - 2 - [β - (3' - sulfamyl - 4' - chlorobenzoyloxy) ethylamino] propane methane sulfonate.

References Cited

UNITED STATES PATENTS

| | | | |
|---|---|---|---|
| 2,789,938 | 4/1957 | Wilcox et al. | 424—317 |
| 3,112,337 | 11/1963 | De Wald et al. | 260—470 |
| 2,991,283 | 7/1961 | Ekenstram | 260—247.1 |

OTHER REFERENCES

De Stevens, "Diuretics," Academic Press, New York (1963), pp. 47–52.

Feit et al., Chem. Abst., 71 314ly 1969.

LORRAINE A. WEINBERGER, Primary Examiner

J. F. TERAPANE, Assistant Examiner

U.S. Cl. X.R.

260—544 M, 577; 424—309